United States Patent
Wang et al.

(10) Patent No.: US 7,552,181 B2
(45) Date of Patent: Jun. 23, 2009

(54) INSTANT COMMUNICATION METHOD

(75) Inventors: Qingming Wang, Guangdong (CN);
Yejun Huang, Guangdong (CN);
Songtao Lin, Guangdong (CN); Peizhao Li, Guangdong (CN)

(73) Assignee: Tencent Technology (Shenzhen) Company Limited, Shenzhen, Guangdong (CN)

( * ) Notice: Subject to any disclaimer, the term of this patent is extended or adjusted under 35 U.S.C. 154(b) by 57 days.

(21) Appl. No.: 11/587,454

(22) PCT Filed: Jan. 19, 2005

(86) PCT No.: PCT/CN2005/000085

§ 371 (c)(1),
(2), (4) Date: Oct. 24, 2006

(87) PCT Pub. No.: WO2005/071532

PCT Pub. Date: Aug. 4, 2005

(65) Prior Publication Data
US 2007/0220091 A1 Sep. 20, 2007

(30) Foreign Application Priority Data
Jan. 19, 2004 (CN) .................. 2004 1 0002635

(51) Int. Cl.
*G06F 15/16* (2006.01)
*G06F 12/00* (2006.01)

(52) U.S. Cl. ..................................... 709/206; 709/207

(58) Field of Classification Search ................. 709/206, 709/207, 250; 719/315, 329
See application file for complete search history.

(56) References Cited

U.S. PATENT DOCUMENTS

| 6,125,442 | A | 9/2000 | Maves et al. |
|---|---|---|---|
| 7,127,685 | B2 * | 10/2006 | Canfield et al. ............. 715/842 |
| 7,328,439 | B1 * | 2/2008 | Clark et al. ................. 719/318 |
| 7,346,658 | B2 * | 3/2008 | Simpson ..................... 709/205 |
| 2002/0160838 | A1 * | 10/2002 | Kim ........................... 463/42 |
| 2002/0174359 | A1 | 11/2002 | Haltmeyer |
| 2003/0054886 | A1 * | 3/2003 | Lion et al. ................... 463/42 |
| 2004/0153363 | A1 * | 8/2004 | Stehling ...................... 705/14 |

* cited by examiner

*Primary Examiner*—Zarni Maung
(74) *Attorney, Agent, or Firm*—Ladas & Parry LLP

(57) ABSTRACT

The present invention is a method for implementing instant messaging, including: registering, in a Hook function, a function for registering an instant messaging sub-process in a current running program used for defining a condition for registering the instant messaging sub-process and a process for registering the instant messaging sub-process as a sub-process of the current running program if the condition is satisfied and is used for displaying a instant messaging sub-window in a window of the current running program; and if running an instant messaging program, calling, by the Hook function, the function for registering an instant messaging sub-process in a current running program, if the condition for registering the instant messaging sub-process is satisfied, creating an instant messaging sub-process, registering the sub-process as the sub-process of the current running program, and displaying the instant messaging sub-window in the current running program.

16 Claims, 1 Drawing Sheet

INSTANT COMMUNICATION METHOD

FIELD OF THE INVENTION

The present invention relates to the network communication technique, and in particular, to a method for implementing instant messaging.

BACKGROUND OF THE INVENTION

The Microsoft DirectX Software Development Kit (SDK) provides a set of excellent Application Programming Interfaces (APIs), which is able to provide various resources used for developing high-quality and real-time applications and one of the main objectives of which is to promote the development of the games and multimedia applications based on the Windows Operating System (OS). Before the DirectX appears, the main game development platform is MS-DOS, and game developers have to try their best to adapt their applications to various hardware devices. Since the DirectX comes into use, the game developers can not only benefit from the device irrelevance of the Windows platform but also possess the characteristic of accessing hardware directly. The main purpose of the DirectX is to provide an ability of accessing hardware as compact as that of the MS-DOS, thereby implementing and improving the operation effect of the applications based on the MS-DOS platform, and removing the obstacle of the innovation of the personal computer hardware.

On the other hand, the developing DirectX is to provide the ability of accessing the hardware in real time with high expressive force for the applications based on the Windows platform on the current or future computer operation systems. The DirectX provides a set of integral and identical interfaces between the hardware device and the application so as to reduce the complexity of installation and configuration and fully use the excellent characteristic of the hardware. By using the DirectX-provided interfaces, software developer can make the best use of the high capabilities provided by the hardware without worrying about those complicated and changeful hardware execution details.

Despite the advantages of the DirectX mentioned above, most games, currently developed based on the DirectX, are resource-occupying-exclusively software. When the user is playing game, the game interface is displayed in full screen, so that the screen can not be optionally switched to other software interface.

At the same time, it has been the first choice currently for net citizens to play the network online game and chat on the net according to statistics, and most net citizens want to play games and chat simultaneously. However, the current instant messaging tools all adopt the standard Windows mechanism, a window can not be called out in a DirectX game of the full-screen mode, where the user has to switch the game window to the desktop to normally use the basic functions of instant messaging, thereby severely affecting the process of the game contents and even causing the self-quitting of the game. Even though some network online games can provide a chat function, the chat function is only limited to the chat between game players, and the game player can not communicate with other friends except the game players by instant messaging, which can not adequately satisfy the instant messaging demands of the game players.

In a similar way, for other users of the software developed based on the DirectX, there also exists the problem that the instant messaging can not be performed if the software is in use for the reason of it monopolizing the resources.

SUMMARY OF THE INVENTION

In view of the above, this invention is mainly to provide a method for implementing instant messaging, so as to meet the demands of instant messaging when a user uses resource-occupying-exclusively software.

To attain the above objectives, the invention provides a method for implementing instant messaging, including:

registering, in a Hook function, a function for registering an instant messaging sub-process in a current running program, wherein, the function for registering an instant messaging sub-process is used for defining a condition for registering the instant messaging sub-process and a process for registering the instant messaging sub-process as a sub-process of the current running program if the condition is satisfied, and is used for displaying a instant messaging sub-window in a window of the current running program; and if running an instant messaging program, comprising:

calling, by the Hook function, the function for registering an instant messaging sub-process in the current running program if the condition for registering the instant messaging sub-process is satisfied, creating an instant messaging sub-process, registering the sub-process as the sub-process of the current running program, and displaying the instant messaging window in the current running program; and interacting instant messaging messages with other instant messaging users by using the created instant messaging sub-process, displaying and receiving, by the instant messaging window, the message contents input by users in the instant messaging message interaction procedure.

In the above solution, registering, in a Hook function, a function for registering an instant messaging sub-process in a current running program, may include:

registering, in the Hook function, the function for registering an instant messaging sub-process in a current running program via calling the SetWindowsHookEx( ) function.

In the above solution, the function for registering an instant messaging sub-process in a current running program may be used for defining:

a trigger condition for calling the function, deciding whether the current event is the trigger condition, and if the trigger condition is satisfied, registering the instant messaging sub-process, comprising: acquiring the process of the current running program, creating an instant messaging sub-process, registering the created instant messaging sub-process as a sub-process of the acquired process of the current running program, and displaying the window corresponding to the instant messaging sub-process according to the affiliation of the instant messaging sub-process and the process of the current running program.

In the above solution, acquiring the process of the current running program, may include: acquiring the handle of the foreground window of the current running program; creating the instant messaging sub-process, comprises: creating an object of an instant messaging window; registering the created instant messaging sub-process as the sub-process of the acquired process of the current running program, comprises: creating the relationship between the handle of the foreground window and the created object of the instant messaging window; and displaying the window corresponding to the instant messaging sub-process, comprises: displaying the object of the instant messaging window.

In the above solution, the condition for registering the instant messaging sub-process is a preset hotkey having been triggered; and calling, by the Hook function, the function for registering an instant messaging sub-process in a current running program if the condition for registering the instant messaging sub-process is satisfied, may include: deciding, by the Hook function, whether the preset hotkey has been pressed, if yes, calling the function.

In the above solution, running the instant messaging program, may include: implementing the number logging in process, comprising: inputting a user number and password of the instant messaging software, and logging in an instant messaging client; and performing calling in the bottom-layer messaging library, comprising: loading, by the instant messaging client, a bottom messaging module to accomplish a function for communication with a server, sending, by the instant messaging client, the logging-in information to the server, authenticating, by the server, the information, and after the authentication is passed, extracting, by the instant messaging client, a friend profile, and calling, by the instant messaging client, a display module to display an interface.

In the above solution, interacting instant messaging messages with other instant messaging users by using the created instant messaging sub-process, may include: interacting, by the created instant messaging sub-process and a process of the system for implementing information interaction with an external server, the instant messaging messages; and interacting, by the process for implementing information interaction with an external server, information with other users.

In the above solution, the current running program may be a resource-occupying-exclusively program.

In the above solution, the resource-occupying-exclusively program is a full-screen game program, and displaying the instant messaging sub-window in the current running program, comprises displaying the instant messaging sub-window in the full-screen window of the game program.

In the above solution, the full-screen game program may be a game program developed based on the DirectX It can be seen that this invention can implement instant messaging while the resource-occupying-exclusively application is running, thereby adequately meeting the instant messaging demands of users under various cases, which is advantageous to popularization and application of instant messaging. With regard to the full-screen game developed based on the DirectX, the beneficial effects of this invention include: further meeting the user's demands of instant messaging when the user plays the DirectX full-screen game, avoiding the frequent operation of switching windows, and improving the chat experience of the game user.

DETAILED DESCRIPTION OF PREFERRED EMBODIMENTS

Figure 1:
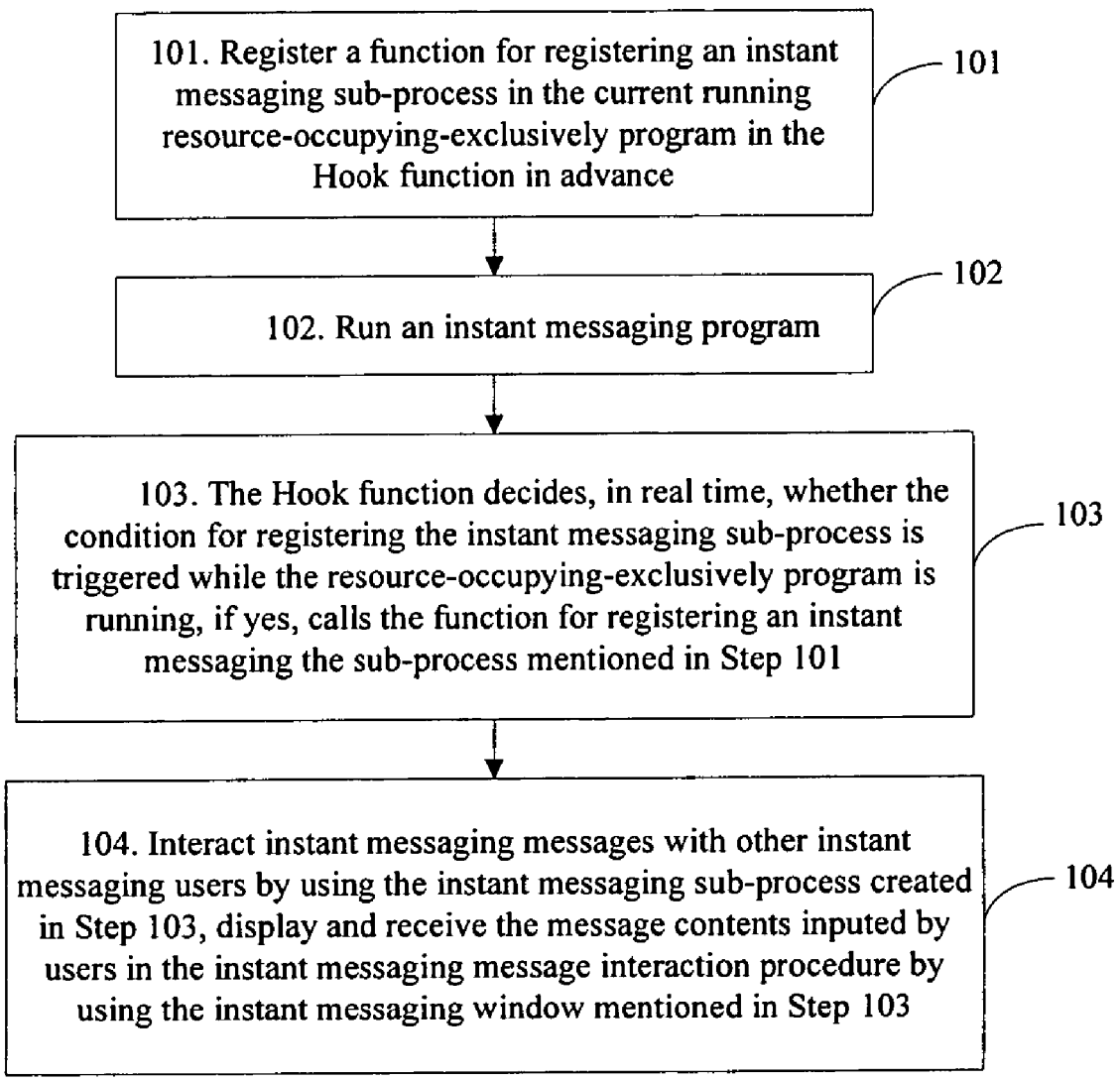
FIG. 1 is a flowchart of the method for implementing instant messaging in accordance with this invention.

This invention combines the Hook technique with the instant messaging technique, thereby implementing instant messaging in the running procedure of the resource-exclusive software This invention is hereinafter described in detail with reference to the accompanying drawing.

Before the detailed description is given, the Hook technique adopted by this invention is described as follows:

A Windows operation system is built on an event-triggered mechanism, and the communications between various system components are implemented via message inter-transmission. In general cases, however, an application can only deal with the message from the interior of the process or the message from other processes. If an application needs to operate on a process, the Hook technique mentioned in this invention should be used.

The Hook is a very important system interface in the Windows operation system, which can easily capture and handle the messages transmitted between other applications, thereby implementing some special functions that some common applications can not realize. The Hook is a mechanism configured in a Microsoft Windows message processing procedure by an application, used for monitoring the message flow and handling a type of messages which has not arrived at the destination window, the essence of which is a program for handling system messages. The program for handling system messages can be hooked in the system to perform the corresponding operation via system invocation. The Hook is generally implemented in a Dynamic Link Library (DLL) file, which can be called by a running program dynamically, thereby monitoring the system message flow in real time. After detecting the preset to-be-monitored message flow, the Hook decides whether the application sending the message flow is that of the current window, if so, the Hook performs the preset steps; otherwise, it does nothing, and the Hook procedure is terminated.

In practical applications, there are various kinds of Hooks, and each kind of Hook is in charge of capturing and handling the corresponding message. The Hook mechanism allows the application to capture and handle a message or a specific event sent to a designated window. The window monitored by the Hook can be either a window of this process or a window created by another process. After a specific message is sent out and has not arrived at the designated window, the Hook program captures the message and obtains the control power thereof. At this time, the hook function is able to perform various modifications of the captured message, even including forcibly terminating the transmission of this message.

Any Hook is maintained by a pointer list (Hook linked list) provided by the system, the pointer of which points to each function of the Hook. The Hook latest installed is set at the head of the list while the earliest-installed Hook is set at the end of the list. When the message monitored by the Hook appears, the operation system call the first Hook function at the head of the list to handle the message, that is to say, the Hook that is installed latest has the priority to acquire the control power. The Hook function mentioned here should be a callback function and can not be defined as a class member function but a common C function. When Hook is in use, it may be divided into two classes, global Hook and thread Hook, and the thread Hook can only monitor a certain thread while the global Hook can monitor all the threads running in the current system. Obviously, the thread Hook can be regarded as a subset of the global Hook, and despite the powerful function of the global Hook, it is rather troublesome to implement a global Hook because the function thereof has to be encapsulated in a DLL before being used.

A process for implementing instant messaging by using the method provided by this invention in the course of using a resource-occupying-exclusively software is hereinafter described in detail with reference to FIG. 1 by taking the resource-occupying-exclusively software developed based on the DirectX as an example. As shown in FIG. 1, in the embodiment, the invention is implemented via the following steps:

Step 101: Register in advance, in a Hook function, a function for registering an instant messaging sub-process in the current running resource-occupying-exclusively program. The function for registering an instant messaging sub-process at least defines: a condition for registering an instant messaging sub-process, registering the instant messaging sub-process as a sub-process of the current running program if the condition is met, and displaying the instant messaging sub-window in the current running program window according to the registration relationship.

Step 102: Run the instant messaging program.

Step 103: Run the resource-occupying-exclusively program as the current running program. And the Hook function decides, in real time, whether the condition for registering an instant messaging sub-process is triggered in the running procedure of the current program, if yes, the Hook function calls the function for registering an instant messaging sub-process mentioned in Step 101, including: creating an instant messaging sub-process and registering the sub-process as a sub-process of the current running program, and displaying the instant messaging sub-window in the current running program;

Step 104: Interact instant messages with other instant messaging users by using the instant messaging sub-process created in Step 103, and display and receive the message contents input by users in the interaction procedure of instant messaging message by using the instant messaging window said in Step 103.

The implementation of the above steps is described hereinafter in detail:

(I) The Implementation of Step 101

In the embodiment of this invention, register, in the Hook function, the function for registering the instant messaging sub-process in the current running resource-occupying-exclusively program by calling the SetWindowsHookEx( ) function provided by the Windows operation system. The function for registering the instant messaging sub-process defines the following contents:

(1) A trigger condition for calling the function. In the embodiment, the condition is to trigger a preset hotkey. Other trigger conditions can also be used in this invention without affecting the implementation of this invention. And the trigger condition refers to the condition for registering an instant messaging sub-process.

(2) Deciding whether the current event is the trigger condition. In this embodiment of the invention, as the preset trigger condition is triggering the hotkey, accordingly, deciding whether the current event is the trigger condition is to decide whether the current event is triggering the preset hotkey.

(3) Registering the instant messaging sub-process if the current event meets the trigger condition, thereby implementing registering the instant messaging sub-process, including:

acquiring the process of the current running resource-occupying-exclusively program, creating an instant messaging sub-process, registering the created instant messaging sub-process as a sub-process of the acquired resource-occupying-exclusively program process, and displaying the window corresponding to the instant messaging sub-process according to the affiliation relationship of the instant messaging sub-process and the resource-occupying-exclusively program process.

In an embodiment of this invention, the resource-occupying-exclusively program process is acquired by obtaining the handle of the foreground window of the program, the instant messaging sub-process is created by creating an object of an instant messaging window, and the above registration procedure is implemented by creating the relationship between the window handle of the current program and the created instant messaging window. As the relationship between the current program window and the instant messaging window has been created, a sub-window can be displayed in the current program by simply displaying the object corresponding to the instant messaging window.

(II) The Implementation of Step 102

First, perform the number logging in procedure, including:

inputting the user number and password of the instant messaging software to log on the instant messaging client; and after logging on the client, performing the process of calling in the bottom-layer messaging library, including:

the instant messaging client loading a bottom-layer messaging module, accomplishing the function for communicating with a server, sending out the logging in information, authenticating the information at the server side, and after the authentication is passed, extracting a friend profile and displaying the program interface by calling a display module.

(III) The Implementation of Step 103

In this embodiment of the invention, taking a full-screen game developed in accordance with the DirectX as a resource-occupying-exclusively program, run the game and enter the full-screen mode. And then, the Hook function decides, in real time, whether the user has triggered the preset trigger condition, if yes, the Hook function calls the function for registering the instant messaging sub-process, and performs registering the instant messaging sub-process which is defined in the function, including:

creating an instant messaging sub-process, registering the sub-process as a sub-process of the game program, and displaying the sub-window corresponding to the sub-process in the full-screen window of the game according to the created affiliation between the sub-process and the game program, wherein, in this embodiment, once the user triggers the set hotkey, calling the function for registering the instant messaging sub-process to execute the above steps mentioned in Step 103.

(IV) The Implementation of Step 104

In an embodiment of this invention, in order to facilitate the implementation, the instant messaging sub-process created in Step 103 exchanges instant messages with a process of the system for implementing information interaction with an external server, and then, the process for implementing information interaction with the external server interacts instant messages with other users, thereby eventually realizing instant messaging interaction with other instant messaging users by using the instant messaging sub-process created in Step 103. The step of displaying and receiving the message contents mentioned in Step 104 can be implemented by using various modes in the prior art without being further described here.

The foregoing is only a preferred embodiment of this invention and is not for limiting this invention, any modification, equivalent replacement or improvement made under the spirit and principles of this invention should be covered by the protection scope of this invention.

The invention claimed is:

1. A method for implementing instant messaging, comprising:

registering an instant messaging sub-process as a sub-process of a running program, wherein the running program exclusively occupies window resources of a system;

displaying a sub-window corresponding to the instant messaging sub-process within the window of the running program; and establishing communications between the instant messaging sub-process and an instant messaging program to provide instant messages via the sub-window within the window of the running program, wherein the method further comprises:

setting a register function for defining a trigger condition for calling the register function, deciding whether a current event is the trigger condition for calling the register function, wherein the instant messaging sub-process is registered if the trigger condition for calling the register function is satisfied, and registering the instant messaging sub-process as the sub-process of the running program comprises:

acquiring the process of the current running program, creating the instant messaging sub-process, registering the created instant messaging sub-process as the sub-process of the acquired process of the current running program;

wherein displaying the sub-window corresponding to the instant messaging sub-process within the window of the running program comprises:

displaying the sub-window corresponding to the instant messaging sub-process according to the affiliation of the instant messaging sub-process and the process of the current running program.

2. The method according to claim 1, wherein the system interface comprises a Hook function, and setting the register function for defining the trigger condition for calling the register function comprises:

setting, in the Hook function, the register function via calling a SetWindowsHookEx( ) function.

3. The method according to claim 2, wherein, the running program is a full-screen game program, and displaying the sub-window corresponding to the instant messaging sub-process within the window of the running program, comprises displaying the sub-window corresponding to the instant messaging sub-process in a full-screen window of the full-screen game program.

4. The method according to claim 3, wherein, the full-screen game program is a game program developed based on a DirectX.

5. The method according to claim 1, wherein,
acquiring the process of the running program comprises: acquiring a handle of the window of the running program;

creating the instant messaging sub-process comprises: creating an object of the sub-window corresponding to the instant messaging sub-process; and registering the created instant messaging sub-process as the sub-process of the acquired process of the running program comprises: creating a relationship between the handle of the window of the running program and the created object of the sub-window corresponding to the instant messaging sub-process.

6. The method according to claim 1, wherein, the register condition is satisfied when a preset hotkey is pressed.

7. The method according to claim 6, wherein, the running program is a full-screen game program, and displaying the sub-window corresponding to the instant messaging sub-process within the window of the running program, comprises displaying the sub-window corresponding to the instant messaging sub-process in a full-screen window of the full-screen game program.

8. The method according to claim 7, wherein, the full-screen game program is a game program developed based on a DirectX.

9. The method according to claim 1, further comprising:
running the instant messaging program to implement information interaction with an external server, wherein establishing the communications between the instant messaging sub-process and the instant messaging program to provide the instant messages comprises:

receiving a first instant message inputted through the sub-window corresponding to the instant messaging sub-process, and sending the first instant message to the external server via the instant messaging program; or receiving a second instant messaging message from the external server via the instant messaging program, and outputting the second message to the sub-window corresponding to the instant messaging sub-process to display.

10. The method according to claim 9, wherein running the instant messaging program comprises:

loading, by the instant messaging program, a bottom messaging module to accomplish a function for communication with the external server after an instant messaging user logs in;

sending logging-in information inputted by the instant messaging user to the external server for authentication;

extracting a friend profile, and calling a display module to display an interface when the authentication of the logging-in information is passed.

11. The method according to claim 1, wherein, the running program is a full-screen game program, and displaying the sub-window corresponding to the instant messaging sub-process within the window of the running program, comprises of displaying the sub-window corresponding to the instant messaging sub-process in a full-screen window of the full-screen game program.

12. The method according to claim 11, wherein, the full-screen game program is a game program developed based on a DirectX.

13. A method for implementing instant messaging, comprising:

registering, in a Hook function, a register function for registering an instant messaging sub-process in a current running program, wherein, the register function for registering an instant messaging sub-process is used for defining a condition for registering the instant messaging sub-process and a process for registering the instant messaging sub-process as a sub-process of the current running program if the condition for registering the instant messaging sub-process is satisfied, and is used for displaying a instant messaging sub-window in a window of the current running program; and if running an instant messaging program, comprising:

calling, by the Hook function, the register function for registering an instant messaging sub-process in the current running program if the condition for registering the instant messaging sub-process is satisfied, creating an instant messaging sub-process, registering the sub-process as the sub-process of the current running program, and displaying the instant messaging window in the current running program; and performing an instant messaging message interaction procedure by using the created instant messaging sub-process, displaying and receiving, by the instant messaging window, message contents input by users in the instant messaging message interaction procedure;

wherein the register function for registering an instant messaging sub-process in a current running program is used for defining:

a trigger condition for calling the register function, deciding whether a current event is the trigger condition for calling the register function, and if the trigger condition for calling the register function is satisfied, registering the instant messaging sub-process, comprising: acquiring the process of the current running program, creating an instant messaging sub-process, registering the created instant messaging sub-process as a sub-process of the acquired process of the current running program, and displaying the window corresponding to the instant messaging sub-process according to the affiliation of the instant messaging sub-process and the process of the current running program.

14. The method according to claim 13, wherein acquiring the process of the current running program, comprises: acquiring a handle of a foreground window of the current running program;
creating the instant messaging sub-process, comprises: creating an object of an instant messaging window;
registering the created instant messaging sub-process as the sub-process of the acquired process of the current running program, comprises: creating the relationship between the handle of the foreground window and the created object of the instant messaging window; and
displaying the window corresponding to the instant messaging sub-process, comprises: displaying the object of the instant messaging window.

15. The method according to claim 13, wherein, the current running program is a resource-occupying-exclusively program.

16. The method according to claim 15, wherein, the resource-occupying-exclusively program is a full-screen game program, and displaying the instant messaging sub-window in the current running program, comprises displaying the instant messaging sub-window in the full-screen window of the game program.

* * * * *